Aug. 4, 1925.

E. MACE 1,548,150

COMBINED SALT AND PEPPER SHAKER

Filed Nov. 24, 1923

Inventor
EMIL MACE.

By A. B. Bowman
Attorney

Patented Aug. 4, 1925.

1,548,150

UNITED STATES PATENT OFFICE.

EMIL MACE, OF SAN DIEGO, CALIFORNIA.

COMBINED SALT AND PEPPER SHAKER.

Application filed November 24, 1923. Serial No. 676,830.

*To all whom it may concern:*

Be it known that I, EMIL MACE, a citizen of the United States, residing at San Diego, in the county of San Diego and State of California, have invented a certain new and useful Combined Salt and Pepper Shaker, of which the following is a specification.

My invention relates to a combined salt and pepper container or shaker, and the objects of my invention are: first, to provide a container of this class having a plurality of separated compartments for the reception of different food seasoning substances and which is provided with a variously perforated removable cover therefor; second, to provide such a container having means whereby the contents from one compartment only may be removed or shaken as desired; third, to provide a combined salt and pepper container whereby the several sets of perforations communicating with the several compartments may be separately closed; fourth, to provide spring means in connection with a container of this class whereby the cover members, adapted to close the perforations, are held in an open or closed position as desired; fifth, to provide novel means for securing the perforated cover in position on the container; sixth, to provide as a whole a novelly constructed combined salt and pepper container, and seventh, to provide such a container which is very simple and economical of construction, durable, and which will not readily deteriorate or get out of order.

Figure 1:
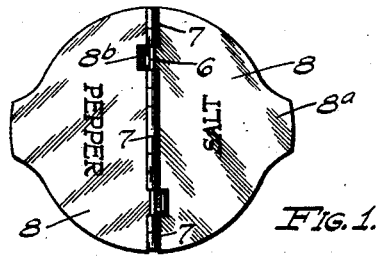
Figure 2:
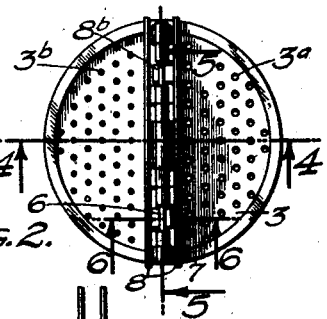
Figure 3:
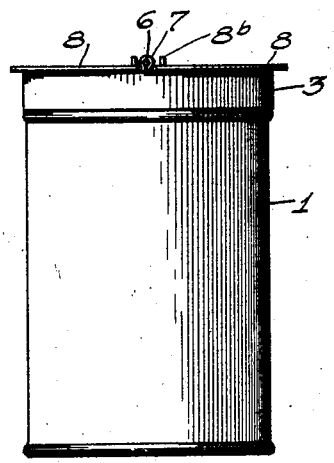
Figure 4:
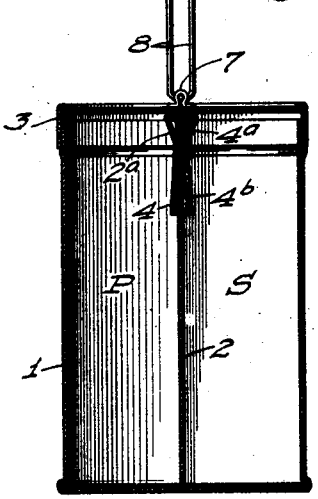
Figure 5:
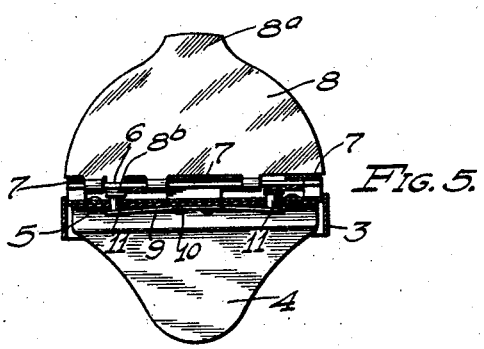
Figure 6:
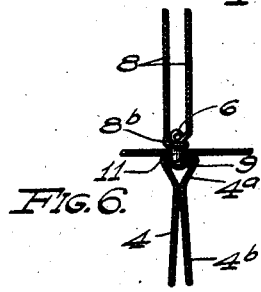

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a top view of my combined salt and pepper container with the pivotal cover members in a downward position; Fig. 2 is another plan view thereof with the pivotal cover members in a raised position; Fig. 3 is a side elevational view thereof; Fig. 4 is a sectional elevational view thereof taken through 4—4 of Fig. 2; Fig. 5 is a sectional elevational view of the perforated and other cover members shown separate and apart from the container, with the section taken through 5—5 of Fig. 2, and Fig. 6 is a slightly enlarged, sectional elevational view through the cover members with the section taken through 6—6 of Fig. 2.

Like characters of reference refer to similar parts and portions throughout the several views of the drawings.

The container 1, partition 2, perforated cover 3, cover retaining member 4, rivets 5, pin 6, journal members 7, cover members 8, spring member 9, rivets 10, and the plunger members 11, constitute the principal parts and portions of my combined salt and pepper container.

The container 1 may be either cylindrical, as shown in the drawings, prismoidal, of any polygonal cross-section, or any other convenient shape desired. The container is provided with a partition member 2 in the interior thereof extending across the same and from the bottom to substantially the top thereof, the upper edge of said partition member being enlarged and reinforced as indicated by $2^a$ in the drawings. The cover 3 extends over the upper edge of the container and is frictionally secured thereto. Said cover is provided on the one side of its median line with large perforations $3^a$ and on the other side with small perforations $3^b$, the same being respectively provided to permit the salt from the compartment S and the pepper from the compartment P to be shaken therethrough. It will be here noted that the cover 3 may be provided with as many separate sets of perforations of different sizes as there are compartments within the container 1. On the inner side of the cover 3 and extending diametrically across the same is a resilient cover retaining member 4 secured to the cover 3 by means of rivets 5 or other convenient means. Said retaining member is constructed with a loop portion $4^a$ at the portion adjacent the cover 3 and outwardly diverging leg portions $4^b$ secured thereto and extending downwardly therefrom. When positioning the cover 3 on the container 1, the leg portions $4^b$ of the retaining member 4 are separated by the enlarged reinforcing portion $2^a$ of the partition 2, which portion $2^a$ is inserted in and retained by the loop portion $4^a$ of the retaining member. A pivot pin 6 is positioned above, spaced from and secured to the upper side of the cover 3 by means of journal members 7, one at the middle portion thereof and others at either end. On said pin 6 are pivotally mounted the cover members 8, which are adapted to cover the perforations 3ª and 3ᵇ, respectively, in the cover 3. Said cover members are provided with outwardly extending portions 8ª so that the same may be easily raised from the downward position to the upright position as shown in Fig. 4 to permit the contents of the different compartments to be shaken therefrom. Each of the cover members 8 are provided with a downwardly extending portion 8ᵇ which is bent at a substantial right angle with the main portion of the cover member. Said portions 8ᵇ are adapted to be engaged by plunger members 11 secured at the ends of a spring member 9. Said spring member is secured to the cover 3 and retaining member 4, within the loop portion thereof, by means of rivets 10, substantially as shown in Figs. 5 and 6 of the drawings. It will be noted that the bent portions 8ᵇ of the cover members are so constructed that the plunger members 11, engaging the same, will be adapted to hold the cover members in a closed or open position, as desired, and that the different cover members are operable independently from each other.

It is obvious from this construction, as illustrated in the drawings and disclosed in the foregoing specification, that there is provided a combined salt and pepper container as aimed at and set forth in the objects of the invention, and though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent, is:

1. A shaker, including a container provided with separate compartments and with perforations at one end communicating with said separate compartments, a spring mounted in said container between said compartments, and a pair of cover members pivotally mounted in line with the partition of said container and separately shiftable relatively to each other, each provided with a right angled portion adapted to engage said spring at both sides of said right angled portion whereby either of said cover members is held in either open or closed positions.

2. A shaker, including a container open at one end and provided with a partition, a cover extending over the open end of said container and provided with perforations communicating with the compartments formed by said partition, a U-shaped resilient retaining member secured on the under side of said perforated cover adapted to engage the partition of said container and retain said cover in position thereon, a pair of cover members pivotally mounted on said perforated cover and separately shiftable relatively thereto and to each other, a leaf spring secured to said perforated cover in the U-portion of said resilient retaining member, and plungers secured to the ends of said spring and extending through said perforated cover, said pivotally mounted cover members being provided at their pivotal portions with right angle portions adapted to be engaged on both sides of said right angle portions by said plungers for holding either of said cover members in either open or closed positions.

In testimony whereof, I have hereunto set my hand at San Diego, California, this 19th day of November, 1923.

EMIL MACE.